United States Patent [19]
Kato et al.

[11] Patent Number: 5,851,441
[45] Date of Patent: Dec. 22, 1998

[54] SYSTEM FOR CONTROLLING HYDRAULIC DRIVE FOR COOLING FAN IN COOLING TOWER

[75] Inventors: Kanji Kato, Chiba; Hiroshi Watanabe, Yotsukaido, both of Japan

[73] Assignee: Ishikawajima-Harima Jukogyo Kabushiki Kaisha, Tokyo-to, Japan

[21] Appl. No.: 729,029

[22] Filed: Oct. 9, 1996

[30] Foreign Application Priority Data

Oct. 30, 1995 [JP] Japan ................................. 7-281611

[51] Int. Cl.⁶ ........................................................ B01F 3/04
[52] U.S. Cl. .......................... 261/26; 60/450; 261/109; 261/DIG. 11
[58] Field of Search ...................... 60/450, 452; 261/24, 261/26, 109, DIG. 11

[56] References Cited

U.S. PATENT DOCUMENTS

| 3,130,557 | 4/1964 | McFarlan | 261/26 |
|---|---|---|---|
| 4,252,751 | 2/1981 | Shito | 261/DIG. 11 |
| 4,446,697 | 5/1984 | Goscenski, Jr. | 60/450 |
| 4,955,585 | 9/1990 | Dickerson | 261/109 |
| 5,040,377 | 8/1991 | Braun et al. | 261/DIG. 11 |
| 5,085,051 | 2/1992 | Hirata | 60/450 |

Primary Examiner—C. Scott Bushey
Attorney, Agent, or Firm—Oblon, Spivak, McClelland, Maier & Neustadt, P.C.

[57] ABSTRACT

Supply water temperature in a cooling tower is detected by a temperature detector, and based on the temperature detected by the temperature detector, a flow control valve in a hydraulic pressure supply line is controlled. As a result, operation of a hydraulic motor connected to a cooling fan can be controlled to efficiently cool down the water temperature to reach a preset temperature. Further, by a pressure-compensated variable displacement regulator of a variable displacement pump, the flow control valve is controlled to have irreducibly minimum pressure difference such that pressure on upstream side is slightly higher than the pressure on downstream side. Therefore, discharge pressure of the variable displacement pump can be suppressed to the irreducibly minimum value, and capacity of the variable displacement pump can be controlled to match the opening degree of the flow control valve.

6 Claims, 8 Drawing Sheets

SYSTEM FOR CONTROLLING HYDRAULIC DRIVE FOR COOLING FAN IN COOLING TOWER

BACKGROUND OF THE INVENTION

The present invention relates to a system for controlling a hydraulic drive for a cooling fan in a cooling tower in energy-saving manner.

Figure 1:
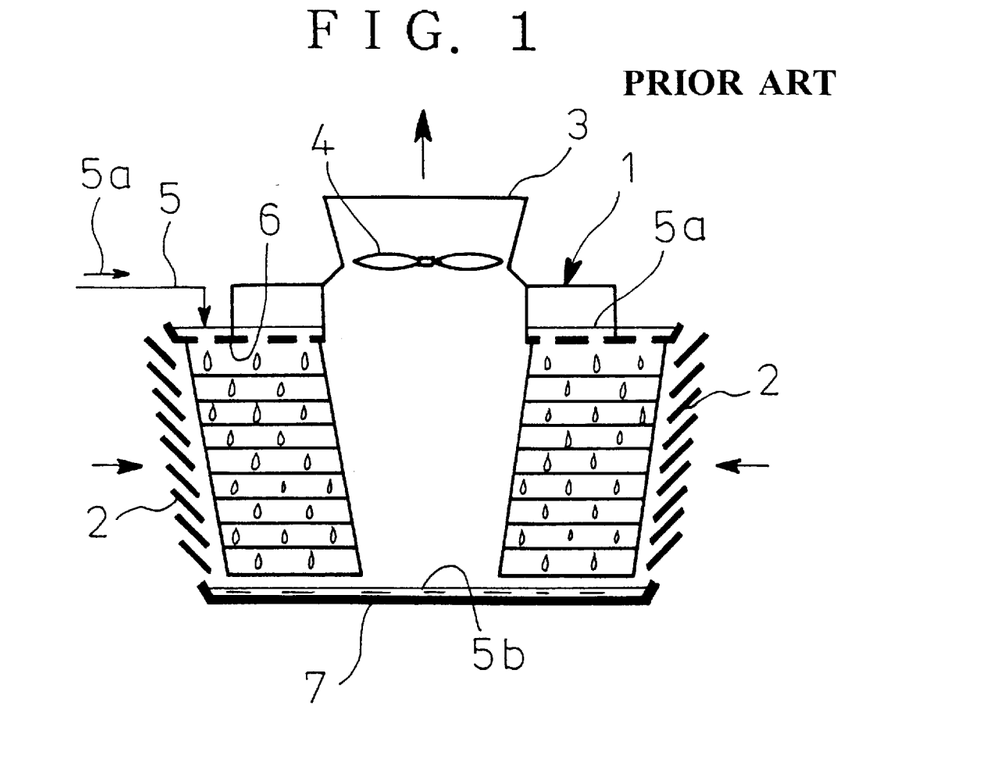
FIG. 1 is a side view of a conventional cooling tower.

FIG. 1 represents a conventional cooling tower for cooling warm water in which air suction surfaces (louver surfaces) 2 are provided on sides of a cooling tower main body 1 on the same level as that of the tower. A cooling fan 4 for circulating the air is installed in an air outlet 3 at a center on a top of the main body 1. The fan 4 is driven to introduce atmospheric air into the air suction surfaces 2 so that the air passes through regulated passages in the main body 1 and is discharged through the outlet 3 to the atmosphere. On the top of the main body 1, a perforated warm-water receiver 6 is installed which receives warm water 5a from a supply line 5 as a medium to be cooled and allows the warm water to flow down through the regulated passages. The warm water 5a continuously flowing down is directly contacted with the atmospheric air introduced through the air suction surfaces 2, and chilled water 5b is collected on a chilled water receptacle 7.

Figure 2:
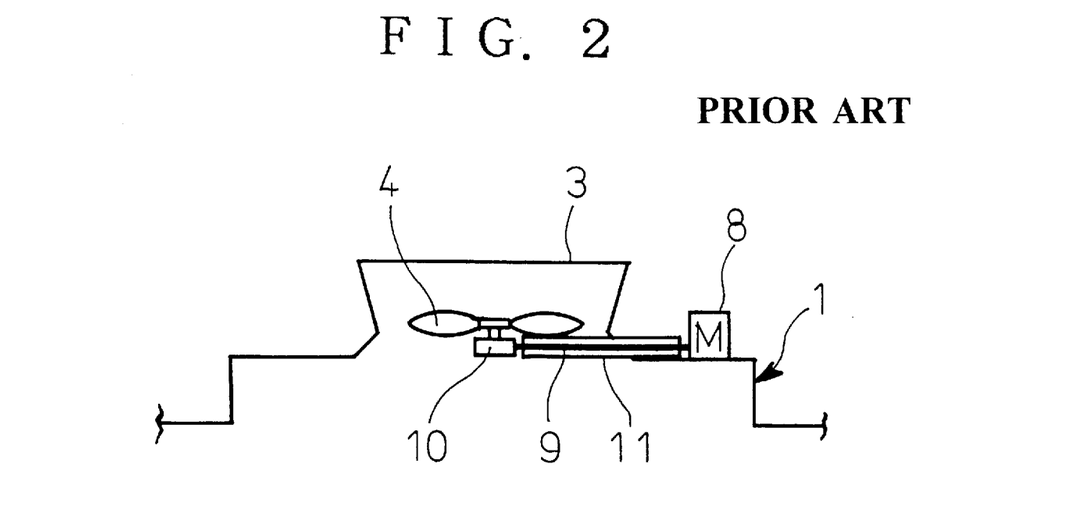
FIG. 2 is a side view of a drive for a cooling fan in the cooling tower shown in FIG. 1.

For driving the cooling fan of the above-mentioned cooling tower, an electric motor 8 is generally installed on the top of the main body 1 as shown in FIG. 2, and a drive shaft 9 connected to the motor 8 extends into the main body 1 so that motive power is transmitted to the cooling fan 4 via a speed reducer 10. The shaft 9 is covered with a common bed 11. The cooling fan 4 is of motor-driven mode and is generally driven with a peripheral speed of no more than 60 m/s.

Though a single-speed motor is generally employed for driving a cooling fan, for energy saving a pole change (two-speed) motor may be used for operation at 50% or 100%; alternatively, a motor with an inverter may be utilized for operation at a variable range of 50% to 100%.

With the motor-driven mode, however, there are problems in that high starting current is required since the cooling fan 4 heavy in weight is driven only by the motor 8, and that much labor and time are required for maintenance and inspection since the motor 8 and/or the speed reducer 10 is installed at the top of the main body 1.

To solve the above problems, the assignee company of the present invention has the prior Japanese Patent Application JP-A-59-30046 (JP-B-60-174500).

In this prior invention, a cooling fan is driven by a hydraulic motor which in turn is driven by pressure oil from a hydraulic pump via a directional control valve. The hydraulic pump is driven by an electric motor and the directional control valve is controlled by electric signal.

The arrangement of the prior invention enables the hydraulic motor to be driven both in normal and reverse directions and to be operated in a range of 0 to 100%. It also enables the electric motor and the hydraulic pump to be installed on ground surface, which facilitates maintenance and inspection. Further, low starting current will suffice since the electric motor is used only to drive the hydraulic pump.

However, in the prior invention, the pressure of the hydraulic pump must be set to a value satisfying a maximum load torque which may be required during a year. Liquid discharged from the hydraulic pump is always at the above-mentioned maximum pressure, though its quantity is automatically controlled to the required quantity of liquid passing through the directional control valve. Accordingly, when lower load pressure of the hydraulic motor is allowable or when lower rotating speed of the cooling fan will suffice owing to slight cooling required because of lower ambient air temperature in winter season or the like, great difference between the pressure of the hydraulic pump for the maximum load torque condition and the lower load pressure required for the hydraulic motor leads to pressure loss, resulting in energy loss.

BRIEF SUMMARY OF THE INVENTION

In the present invention, operational control means for a cooling fan is specified and energy matching with the liquid pressure and flow rate required for a hydraulic motor connected to the cooling fan can be supplied by a hydraulic pump, thereby attaining energy saving of a motor for driving the hydraulic pump.

Preferred embodiments of the present invention will be described in conjunction with the drawings.

DETAILED DESCRIPTION OF THE PREFERRED EMBODIMENTS

Figure 3:
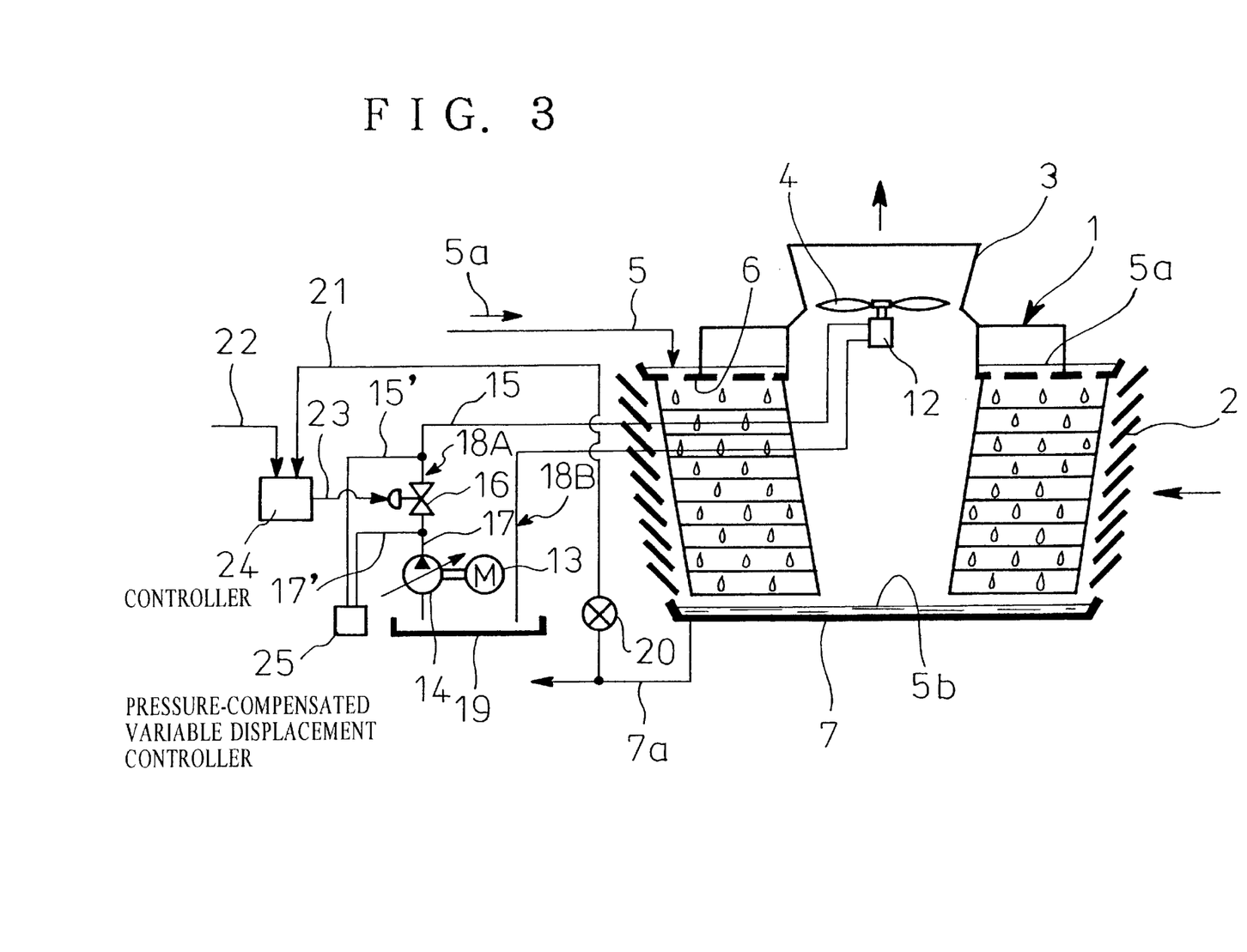
FIG. 3 is a side view of an embodiment of a system for controlling a hydraulic drive for a cooling fan in a cooling tower according to the present invention.

FIG. 3 represents an embodiment of the present invention applied to the cooling tower shown in FIG. 1. The same components as in FIG. 1 are referred to by the same reference numerals.

In FIG. 3, a cooling fan 4 at an air outlet 3 on a top of a cooling tower main body 1 is connected to an output shaft of a hydraulic motor 12, and a variable capacity or variable displacement pump 14 driven by a motor 13 is installed on the ground surface. The hydraulic motor 12 is connected to a flow control valve 16 (e.g., a known, proportional electromagnetic flow control valve) via a downstream side hydraulic pressure supply line 15, and the valve 16 is connected to the pump 14 via an upstream side hydraulic pressure supply line 17, thus constituting a hydraulic pressure supply line 18A. Return side of the hydraulic motor 12 is connected to a tank 19 via a return line 18B so that the pressure liquid is returned to the suction side of the pump 14.

A temperature detector 20 is provided for detecting temperature of chilled water 5b in a chilled water receptacle 7 or chilled water 5b to be supplied to a target area via a water supply line 7a. A controller 24 is provided for comparing temperature 21 detected by the detector 20 with preset temperature 22 and controls opening degree of the flow control valve 16 by a control signal 23 based on difference of the above temperature values.

Further, the pump 14 is provided with a pressure-compensated variable capacity or variable displacement regulator 25 (pressure compensator).

Figure 4:
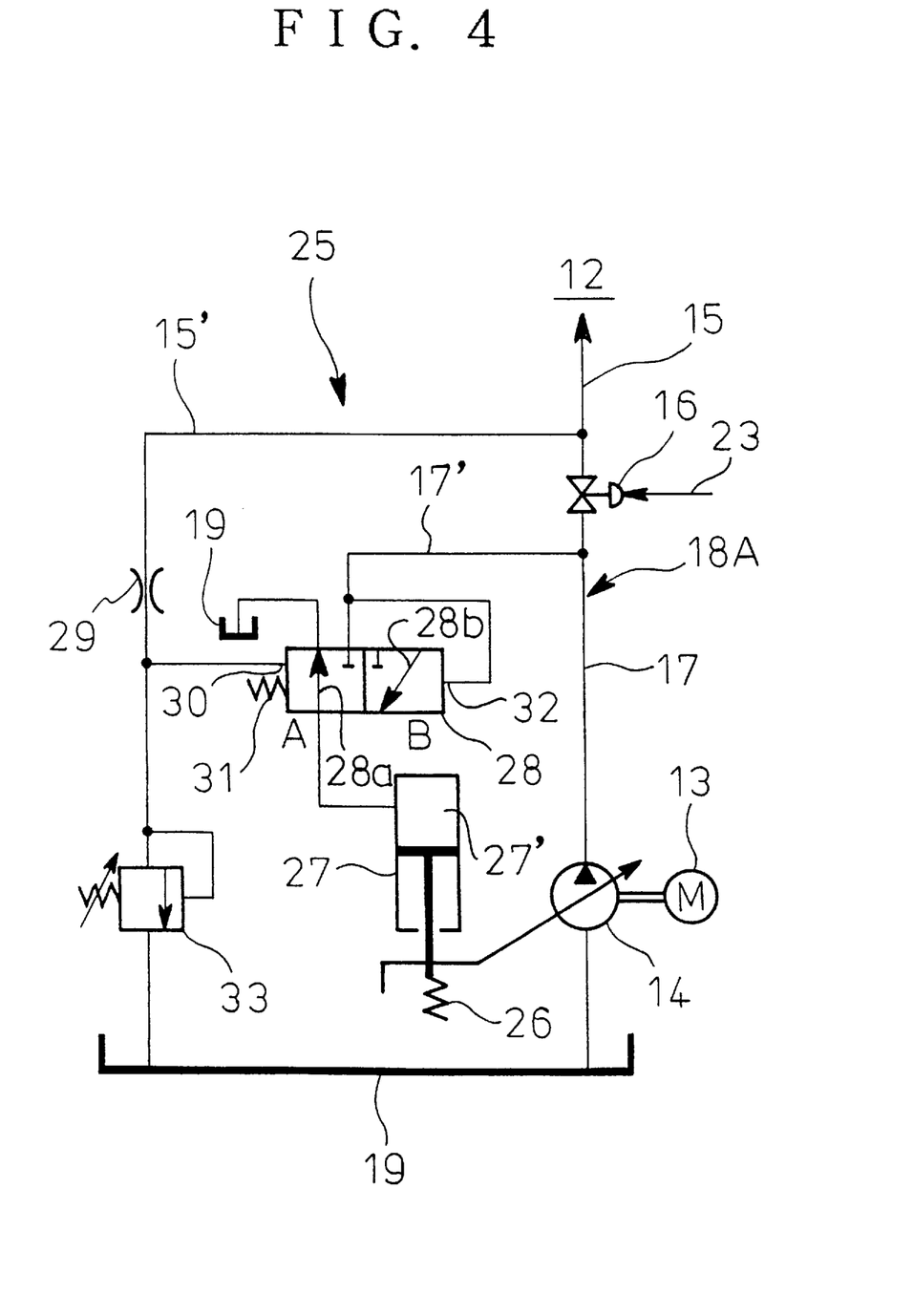
FIG. 4 is a block diagram of an example of a pressure-compensated variable capacity or displacement controller used in the present invention.

FIG. 4 shows an example of the regulator 25, which comprises capacity increasing biasing means 26 such as a spring for biasing capacity of the pump 14 in ever increasing direction, an actuator 27 with a liquid chamber 27' for actuation in a direction to decrease capacity of the pump 14 against the action of the biasing means 26 and a control valve 28 for controlling operation of the actuator.

On one side or capacity increasing side A of the control valve 28, there are provided a low pressure port 30 connected via an orifice 29 to a branch line 15' of the downstream-side hydraulic pressure supply line 15 of the flow control valve 16 and a spring 31 for adding force to the pressure of the port 30 as well as a port 28a for communicating the liquid chamber 27' of the actuator 27 with the tank 19. On the other side or capacity decreasing side B of the control valve 28, there are provided a high pressure port 32 connected via a branch line 17' to the upstream side hydraulic pressure supply line 17 of the flow control valve 16 and a port 28b for supplying pressure of the branch line 17' to the liquid chamber 27' of the actuator 27. The capacity of the pump 14 is controlled via the actuator 27 such that upstream side pressure of the flow control valve 16 is maintained at a value somewhat higher than the downstream-side pressure thereof.

More specifically, on the capacity increasing side A of the control valve 28, pressure on the downstream side of the flow control valve 16 is controlled, and the spring 31 is also provided. Control is made to have pressure somewhat higher than the hydraulic pressure on the downstream side of the hydraulic pressure supply line 15. When this pressure is equalized with the hydraulic pressure on upstream side of the flow control valve 16, which controls the decreasing side B of the control valve 28 via the port 32 (i.e. when the upstream side pressure is higher than the downstream side pressure by a preset pressure value set by the spring 31), the control valve 28 is balanced at an intermediate position where both the ports 28a and 28b are closed. In this case, force of the spring 31 is set or determined such that the difference between the hydraulic pressure on upstream side of the flow control valve 16 and hydraulic pressure on the downstream side is irreducibly minimized.

Downstream of the orifice 29 on the branch line 15', a maximum pressure setting valve 33 is provided. When pressure in the supply line 15, exerting action through the orifice 29, becomes higher than the preset pressure, the maximum pressure setting valve 33 is opened to the tank 19. As a result, pressure downstream of the orifice 29, i.e. pressure at the low pressure port 30, is decreased. Then, the capacity decreasing side B of the control valve 28 is opened, and hydraulic pressure on the upstream side of the hydraulic pressure supply line 17 is supplied to actuating side of the actuator 27, and the actuator is expanded. The capacity of the variable displacement pump 14 is then decreased against the action of the biasing means 26, thereby ensuring safety of the system.

Next, mode of operation of the above embodiment will be described.

For control of maintaining supply water temperature at a constant level, the temperature 21 of the chilled water 5b detected by the detector 20 in the supply water line 7a in FIG. 3 is compared with the preset temperature 22 inputted to the controller 24, and the flow control valve 16 is controlled by the control signal 23. If the detected temperature 21 is higher than the preset temperature 22, the controller 24 opens the flow control valve 16 to increase passing flow rate in the valve 16, whereby the number of revolutions of the cooling fan 4 driven by the hydraulic motor 12 is increased to enhance cooling of the warm water 5a. Thus, the temperature of the chilled water 5b is controlled to the preset temperature 22.

Conversely, if the detected temperature 21 of the chilled water 5b is lower than the preset temperature 22, the controller 24 controls to throttle the flow control valve 16 and decreases passing flow rate in the valve 16. As a result, number of revolutions of the cooling fan 5 driven by the hydraulic motor 12 is decreased. Thus, cooling of the warm water 5a is suppressed and temperature of the chilled water 5b is controlled to the preset temperature 22. In this way, temperature of the supply water is always maintained at the preset temperature 22.

On the other hand, when opening degree of the flow control valve 16 is controlled as described above, hydraulic pressure in the downstream side of the hydraulic pressure supply line 15 is changed by increase or decrease of pressure drop caused by passing flow rate in the flow control valve 16.

For example, in the balanced state where both the ports 28a and 28b of the control valve 28 in FIG. 4 are closed, if control is made to increase the opening degree of the flow control valve 16, pressure drop in the flow control valve 16 decreases and pressure on the downstream side increases. Then, pressure applied on the low pressure port 30 of the control valve 28 increases. As a result, the control valve 28 is controlled to open the port 28a on the capacity increasing side A. Accordingly, pressure oil in the liquid chamber 27' of the actuator 27 is returned to the tank 19, and the actuator 27 is controlled to shrink by the action of the biasing means 26. Then, the variable displacement pump 14 is controlled to increase the capacity, and pressure to control the capacity increasing side A of the control valve 28 keeps balance with the pressure to control the capacity decreasing side B, and the system is brought to a standstill.

In the state where the control valve 28 is kept in balance, when the flow control valve 16 is controlled to be throttled, pressure drop in the flow control valve 16 increases and pressure on the downstream side is decreased. Then, pressure applied on the low pressure port 30 of the control valve 28 decreases and pressure on the low pressure port 30 is decreased than the pressure of the high pressure port 32. Thus, the control valve 28 is controlled to open the port 28b, and hydraulic pressure in the upstream side of the hydraulic pressure supply line 17 upstream of the flow control valve 16 is supplied to the liquid chamber 27' of the actuator 27, and the actuator 27 is expanded. Consequently, overcoming the action of the capacity increasing biasing means 26, capacity of the variable displacement pump 14 is decreased. As a result, pressure on the low pressure port 30 of the control valve 28 keeps balance with pressure on the high pressure port 32, and the system is brought to a standstill.

As described above, even when opening degree of the flow control valve 16 is changed, automatic control is performed at the irreducible minimal pressure difference at all times so that upstream pressure is somewhat higher than the pressure on the downstream side of the flow control valve 16. Accordingly, discharge pressure of the variable displacement pump 14 is always kept at the minimum level, and the pump 14 can be controlled to such a value as necessary for opening degree of the flow control valve 16, thus saving energy for the motor 13.

Figure 5:
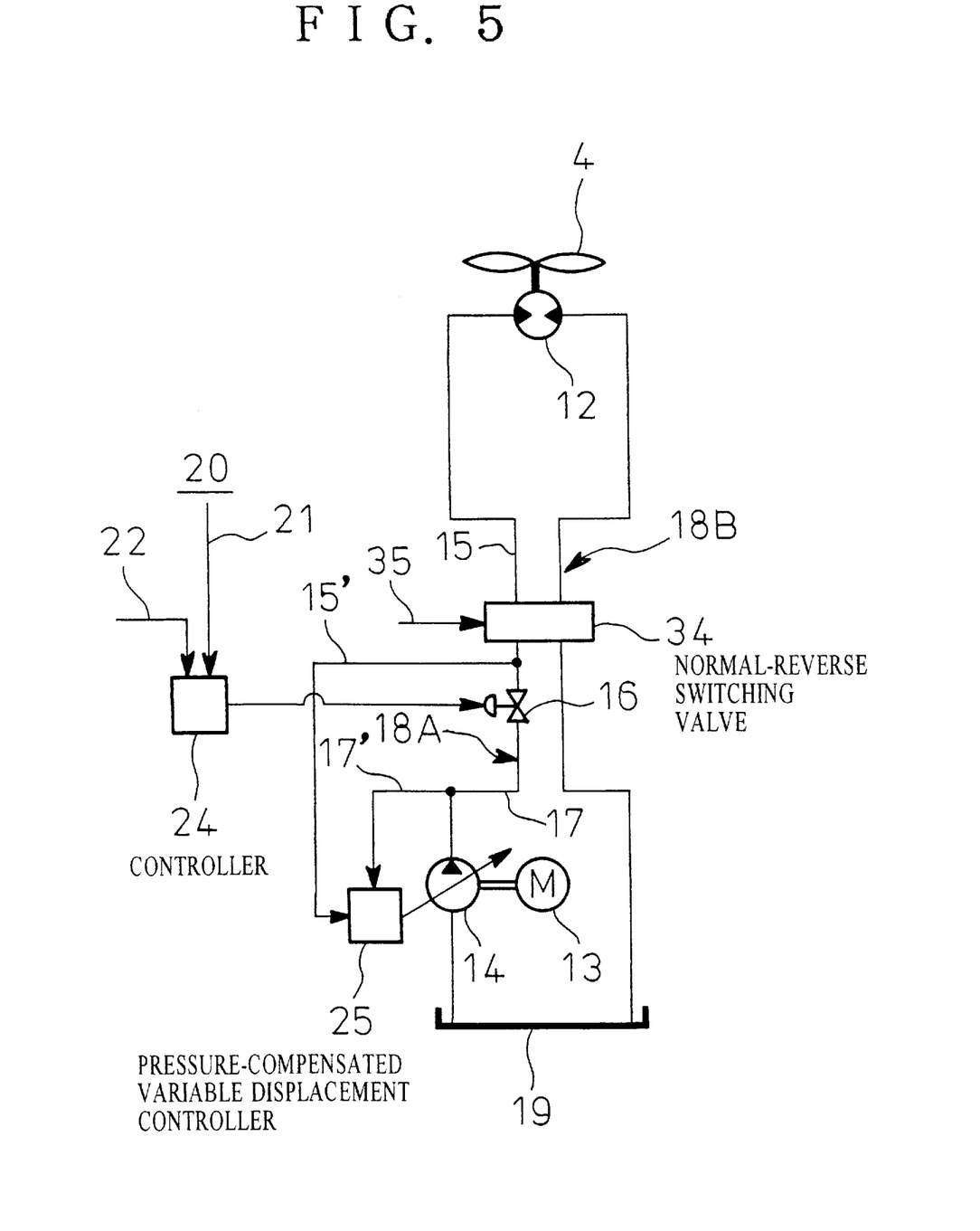
FIG. 5 is a schematic system diagram of another embodiment of the present invention.

FIG. 5 shows a case where a normal-reverse switching valve 34 is provided across the downstream side of the hydraulic pressure supply line 15 connected to the hydraulic motor 12 and the return line 18B. In winter season, for example, the air suction surfaces 2 (FIG. 1) may be frozen when cold air is introduced. However, if the normal-reverse switching valve 34 is switched over in the direction of arrow 35 manually or automatically to operate the cooling fan 4 in reverse direction, warm air is blown out through the air suction surfaces 2, thereby preventing freezing of the air suction surfaces 2.

Figure 6:
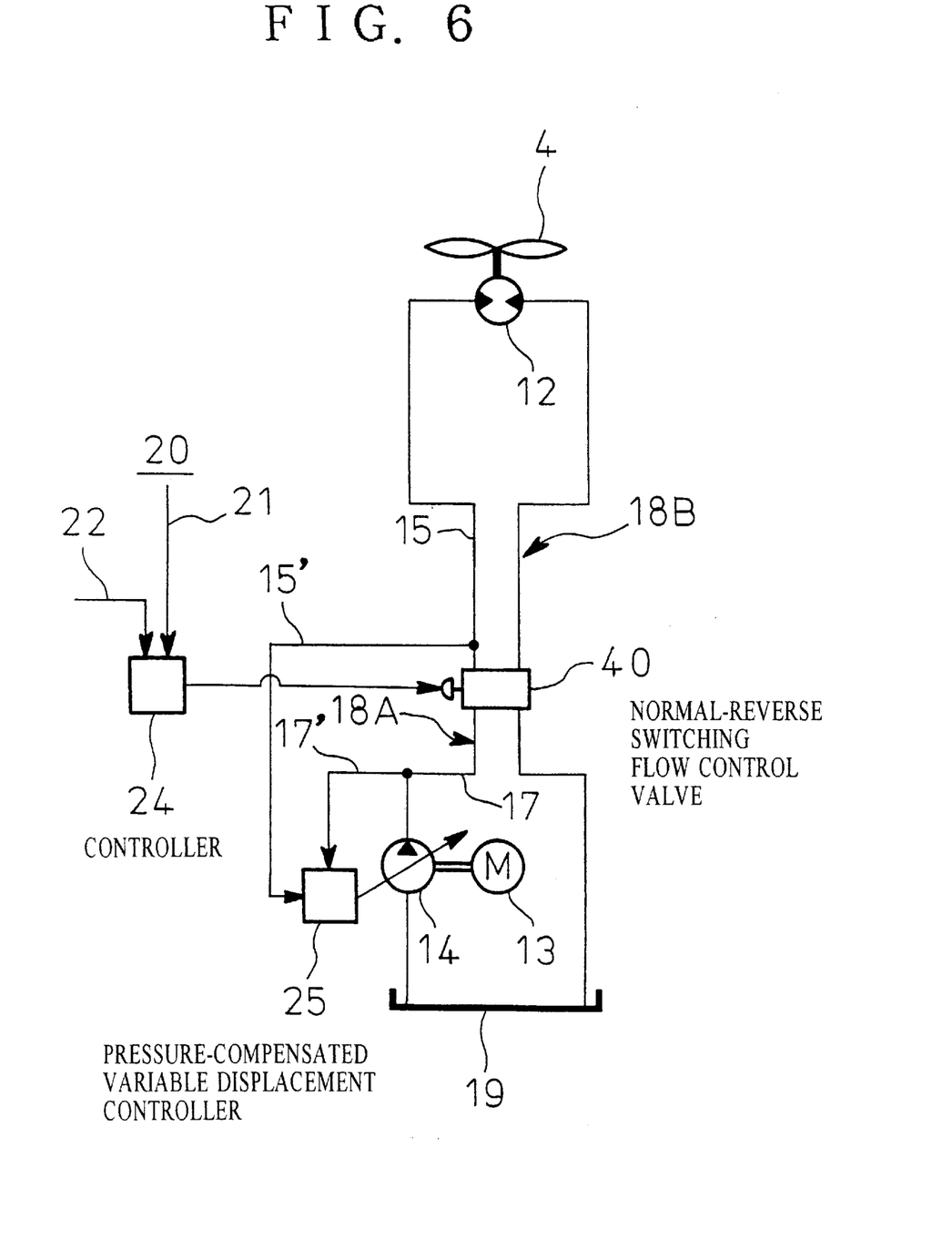
FIG. 6 is a schematic system diagram of a further embodiment different from that of FIG. 5.

FIG. 6 represents a case where a normal-reverse switching flow control valve 40 (e.g. a known, proportional electromagnetic directional flow control valve) serving as both the flow control valve 16 and the normal-reverse switching valve 34 is provided across the supply line 18A and the return line 18B, and is controlled by a command from the controller 24. By this mode, the same operation as in FIG. 5 can be carried out.

Figure 7:
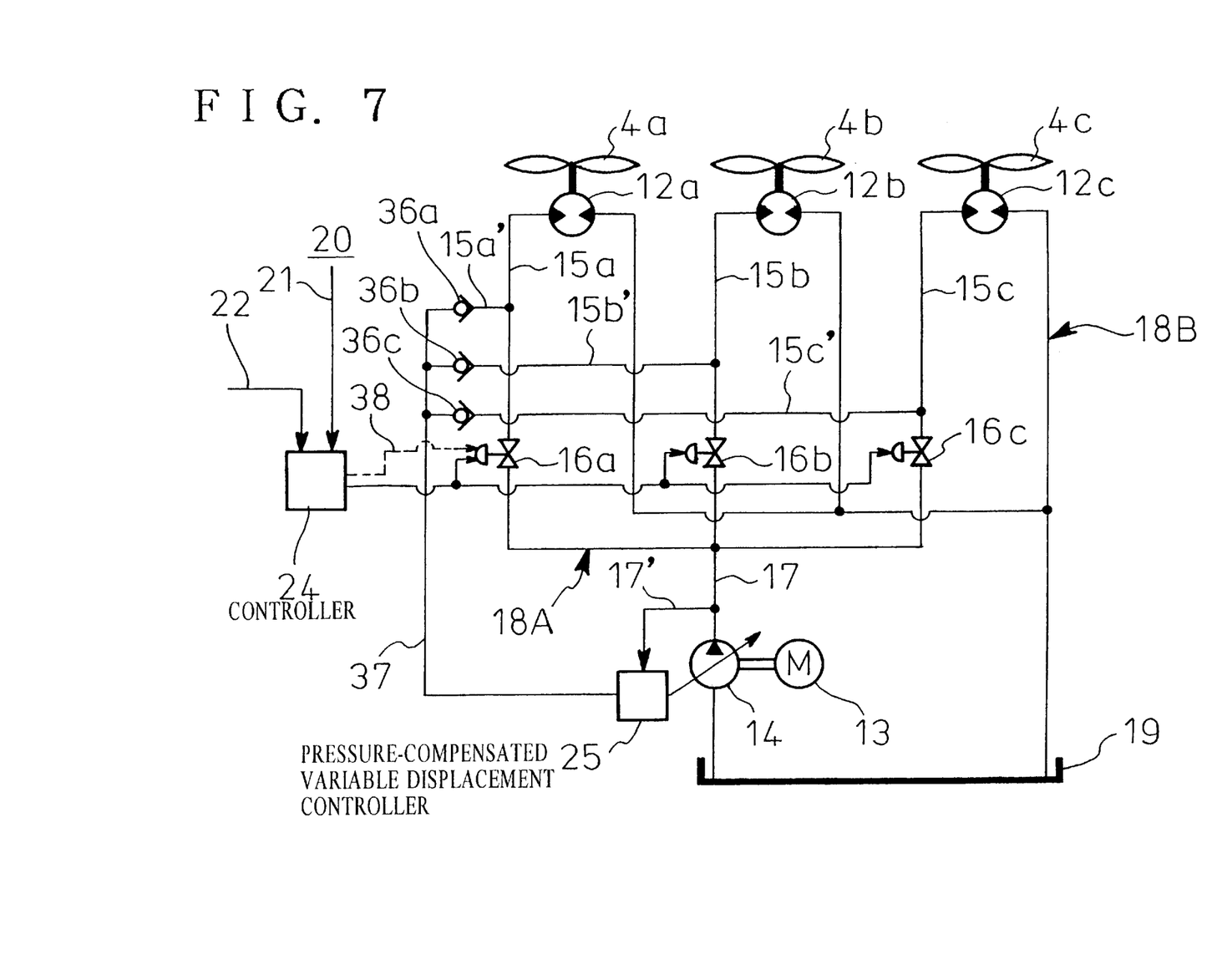
FIG. 7 is a schematic system diagram of a still further embodiment of the present invention.

FIG. 7 represents a case where a plurality of cooling fans (in the figure, three fans 4a, 4b and 4c) are provided which are driven by hydraulic motors (in the FIGS., 12a, 12b and 12c), respectively. In general, the same number of the variable displacement pumps as the hydraulic motors are installed to provide a hydraulic pressure circuit. Here, flow control valves 16a, 16b and 16c are respectively arranged on downstream sides of the hydraulic pressure supply lines 15a, 15b and 15c, branched from the upstream side of the hydraulic pressure supply line 17 supplied from a single variable displacement pump. Check valves 36a, 36b and 36c are respectively arranged in outflow direction on branch lines 15a', 15b' and 15c' connected to downstream sides of the flow control valves 16a, 16b and 16c. Outlets of the check valves 36a, 36b and 36c are joined into a pilot line 37 to be connected to the pressure-compensated variable displacement regulator 25; and the branch line 17' is connected to the regulator 25.

In the above arrangement, the highest hydraulic pressure among the three downstream side hydraulic pressure supply lines 15a, 15b, and 15c is introduced into the pressure-compensated variable displacement regulator 25 as pilot pressure, and discharge pressure of the capacity displacement pump 14 is controlled to a pressure value somewhat higher than driving pressure of the hydraulic motor 12, which is the highest loading pressure.

Further, in the case where there are provided three cooling fans 4a, 4b and 4c as shown in FIG. 7, when numbers of revolutions of the cooling fans 4a, 4b, and 4c are decreased due to low ambient air temperature, efficiency of the hydraulic pressure circuit decreases. If design is made such that, when the number of revolutions is decreased to a certain value, i.e. when the preset temperature 22 is lower than the predetermined level, a stop signal 38 is outputted to, say, the flow control valve 16a by the controller 24 to close the flow control valve 16a, then the hydraulic motor 12a and the cooling fan 4a are stopped, and the operation is performed only with the remaining cooling fans 4b and 4c, thus increasing the efficiency of the hydraulic pressure circuit. In this case, it is needless to say that the stop signal 38 to stop the cooling fan 4a is determined in a range such that, when operation is switched over to the remaining two cooling fans 4b and 4c, number of revolutions of each of the fans 4b and 4c will not exceed a maximum limit.

In the embodiment shown in FIG. 7, the flow control valves 16a, 16b and 16c are provided on the downstream side hydraulic pressure supply lines 15a, 15b and 15c so that the number of revolutions of each of the cooling fans 4a, 4b and 4c can be independently controlled.

However, it is frequent in a cooling tower that the cooling fans 4a, 4b and 4c are operated at almost the same number of revolutions for control of the water temperature in the cooling tower as a whole.

Figure 8:
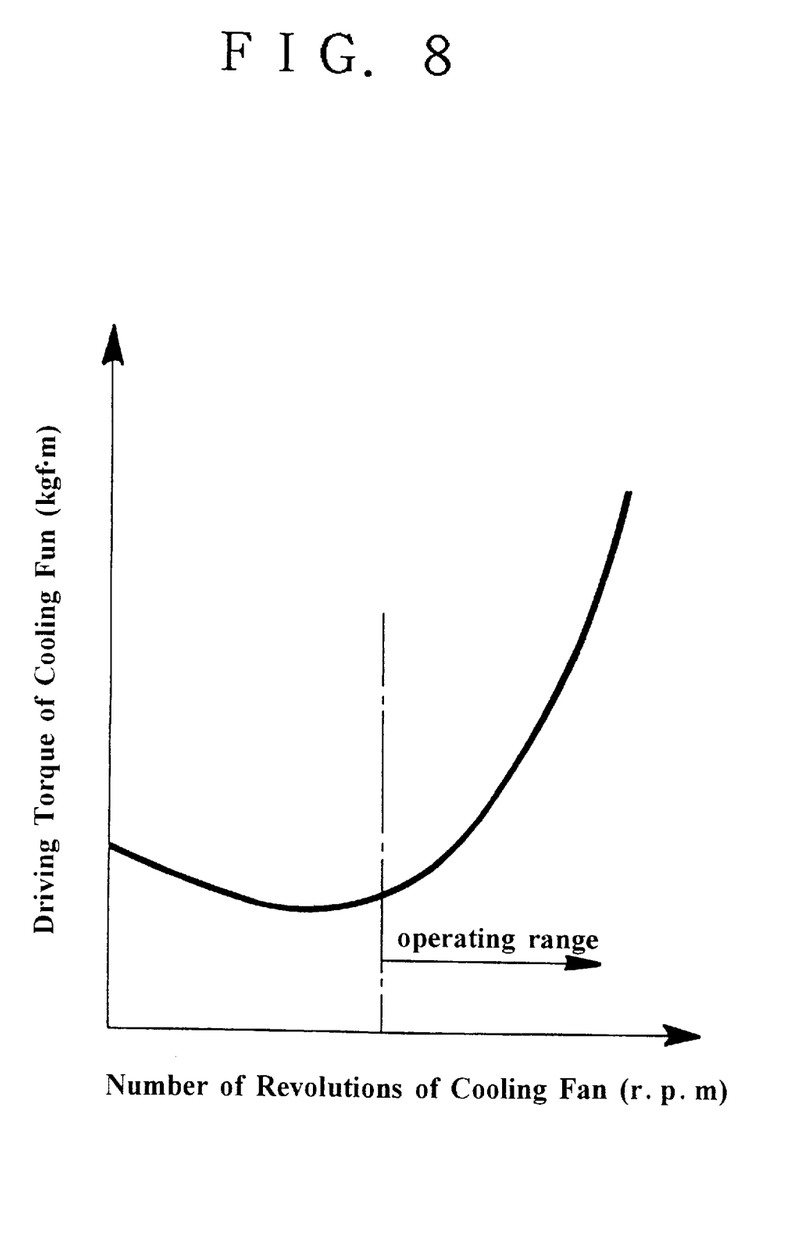
FIG. 8 is a diagram showing relationship between number of revolutions of the cooling fan and driving torque.

As shown in FIG. 8, the properties of the cooling fans 4a, 4b and 4c are generally such that, when the number of revolutions of each of the cooling fans 4a, 4b and 4c increases in normal operating range, the required driving torque also increases. In hydraulic driving and controlling of the cooling fans 4a, 4b and 4c, hydraulic supply pressure of the hydraulic motors 12a, 12b and 12c is theoretically in proportion to driving torque of the cooling fans 4a, 4b and 4c, and liquid supply flow rate is in proportion to the number of revolutions of the cooling fans 4a, 4b and 4c.

Figure 9:
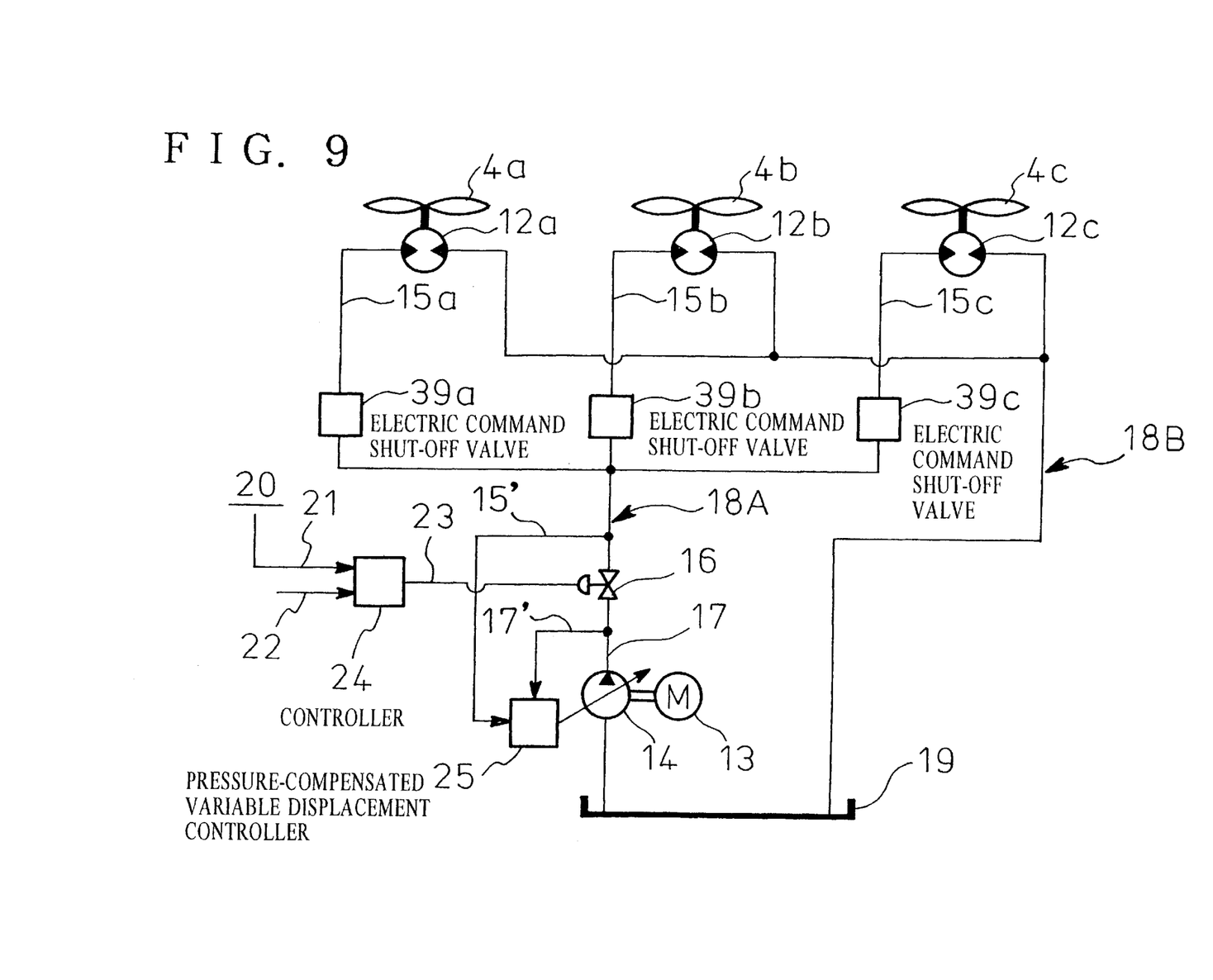
FIG. 9 is a schematic system diagram of a yet still further embodiment of the present invention.

FIG. 9 shows a case where a hydraulic system more economical than that of FIG. 7 is provided by utilizing such property of the cooling fans 4a, 4b and 4c. A single flow control valve 16 is arranged on the upstream side of the hydraulic pressure supply line 17, and the pressure-compensated variable displacement regulator 25 is connected to downstream side and upstream side of the flow control valve 16 on the upstream side of the hydraulic pressure supply line 17 via branch lines 15' and 17'. Further, the supply line is branched to downstream side hydraulic pressure supply lines 15a, 15b and 15c at a point downstream of the branch point of the branch line 15'.

In the above arrangement, for example, if number of revolutions of one of the cooling fans 4a, 4b and 4c decreases due to variations in manufacturing conditions, hydraulic supply pressure is naturally decreased. However, because the downstream side hydraulic pressure supply lines 15a, 15b and 15c of the hydraulic motors 12a, 12b and 12c are branched and communicated with each other, the hydraulic motors 12a, 12b and 12c are driven by the same supply pressure, i.e. by the same torque, and the decreased number of revolutions of the cooling fan is brought back to that of the other cooling fans. In this way, the supply flow rate branched at the same hydraulic supply pressure does not cause substantial difference owing to the above-mentioned property of the cooling fans, i.e. operation can be carried out without causing substantial difference in the number of revolutions of the cooling fans 4a, 4b and 4c.

In the arrangement of FIG. 9, electric command shut-off valves 39a, 39b, and 39c (such as electromagnetic valves) may be installed on the downstream side hydraulic pressure supply lines 15a, 15b, and 15c. When, number of revolutions decreases in the cooling fans 4a, 4b and 4c, one of the shut-off valves 39a, 39b or 39c can be operated to reduce the number of the hydraulic motors 12a 12b and 12c in operation, whereby the remaining hydraulic motors and the cooling fans can be operated at more efficient revolutions.

In a system for controlling a hydraulic drive for a cooling fan in a cooling tower according to the present invention, supply water temperature in the cooling tower 1 is detected by the temperature detector 20, and based on the temperature 21 detected by the temperature detector 20, the flow control valve 16 in the hydraulic pressure supply line 18A is controlled. As a result, operation of the hydraulic motor 12 connected to the cooling fan 4 can be controlled to efficiently cool down the water temperature to reach the preset temperature 22. Further, by the pressure-compensated variable displacement regulator 25 of the variable displacement pump 14, the flow control valve 16 is controlled to have irreducibly minimum pressure difference such that pressure on upstream side is slightly higher than the pressure on downstream side. Therefore, discharge pressure of the variable displacement pump 14 can be suppressed to the irreducibly minimum value, and capacity of the pump 14 can be controlled to match the opening degree of the flow control valve 16, thereby saving energy for the system.

Also, a normal-reverse switching valve or a normal-reverse switching flow control valve may be provided, which enables the cooling fans to be rotated in reverse direction for prevention of freezing of the air suction surfaces.

What is claimed is:

1. A system for controlling a hydraulic drive for a cooling fan in a cooling tower, comprising a hydraulic motor connected to the cooling fan, a variable displacement pump connected to said hydraulic motor via a hydraulic pressure supply line and driven by a motor, a flow control valve arranged in said hydraulic pressure supply line, a temperature detector for detecting supply water temperature in the cooling tower, a controller for controlling said flow control valve based on a difference between a temperature detected by said temperature detector and a preset temperature and a pressure-compensated variable displacement regulator for controlling capacity of the variable displacement pump to maintain irreducibly minimum pressure difference between pressure on upstream side and pressure on downstream side of the flow control valve in said hydraulic pressure supply line.

2. A system according to claim 1, wherein the pressure-compensated variable displacement regulator comprises a capacity increasing biasing means for biasing in a direction to increase capacity of the variable displacement pump, an actuator for actuating in a direction to decrease capacity of the variable displacement pump against action of said biasing means and a control valve having, at one end thereof, a low pressure port connected to downstream side of the flow control valve and a spring for adding force to the pressure thereof and having, at the other end thereof, a high pressure port connected to upstream side of said flow control valve, said control valve controlling said actuator such that pressure difference between pressure on upstream side and pressure on downstream side of the flow control valve keeps balance with force of the spring.

3. A system according to claim 1 wherein a normal-reverse switching valve is provided across the hydraulic pressure supply line connected to the hydraulic motor and a return line.

4. A system according to claim 2 wherein a normal-reverse switching valve is provided across the hydraulic pressure supply line connected to the hydraulic motor and a return line.

5. A system according to claim 1 wherein, in lieu of the flow control valve in the hydraulic pressure supply line, a normal-reverse switching flow control valve is arranged across the hydraulic pressure supply line and a return line.

6. A system according to claim 2 wherein, in lieu of the flow control valve in the hydraulic pressure supply line, a normal-reverse switching flow control valve is arranged across the hydraulic pressure supply line and the return line.

* * * * *